Reissued Apr. 26, 1938

Re. 20,709

UNITED STATES PATENT OFFICE 20,709

LUBRICATING GREASE AND METHOD FOR ITS PRODUCTION

Donald A. Lister, Brunswick, Ga., assignor to Hercules Powder Company, Wilmington, Del., a corporation of Delaware No Drawing. Original No. 2,103,204, dated December 21, 1937, Serial No. 97,174, August 21, 1936. Application for reissue January 27, 1938, Serial No. 187,227

11 Claims. (Cl. 87—9)

This invention relates to an improved lubricating grease, and more particularly it relates to a lubricating grease containing a metallic salt of a rosin which has been treated to decrease its unsaturated characteristic by an inter- and intra-molecular rearrangement and to a method for the production thereof.

Heretofore it has been known to make various lubricating greases, such as, cup grease, journal grease, axle grease, and the like, by dissolving a metallic salt of a fraction of rosin oil in a lubricating oil to produce a heavy cream or a stiff paste. Such lubricating greases frequently contain water emulsified as an internal phase to increase their stiffness. Fractions of rosin oil prepared from gum rosin are ordinarily used to prepare the metallic salts used in such greases. The metallic salts of fractions of wood rosin oil are not suited to the production of grease due to their very poor grease setting action.

Metallic salts of the fraction of gum rosin oil known as "kidney oil", constituting about 35–40% of the rosin oil, are preferred for use in the production of grease, although the metallic salts of the "bloom oil" fraction may also be used. The bloom oil fraction represents about 20% of the rosin oil, so a total of only about 60% of rosin oil is useful for the production of greases. In addition to the disadvantages of being able to use only about 60% of gum rosin oil and being unable to use wood rosin oil, the use of rosin oil shows the additional disadvantages of being subject to oxidation and discoloration on aging, due to the chemical unsaturation of the rosin oil.

Now, I have found that the metallic salts of a rosin which has been subjected to treatment with a suitable catalyst, such as, for example, a hydrogenation catalyst, as, nickel platinum, palladium, etc. at an elevated temperature of, for example, from about 150° C. to about 200° C., in the absence of any added material capable of reducing the unsaturation of the rosin, are superior grease setting agents and that lubricating greases made therefrom are resistant to atmospheric oxidation and discoloration. A rosin which has been treated with a catalyst according to this process will hereinafter be termed "Hyex rosin."

The metallic salts of a Hyex rosin which has been prepared from wood rosin or from the various types of gum rosin may advantageously be used in the improved lubricating greases in accordance with this invention. Furthermore, this invention makes possible the utilization of substantially 100% of rosin in the preparation of grease, and the grease produced is resistant to oxidation and discoloration, with the resultant undesirable banding.

The product, in accordance with this invention, comprises essentially a solution of a metallic salt of a Hyex rosin in a lubricating oil, which may, if desired, contain water emulsified therein as an internal phase. The lubricating grease, in accordance with this invention, may also contain talc, graphite, etc. in powdered form to impart desirable specific properties to it. The metallic salt of a Hyex rosin contained in the product according to this invention, is a salt of a Hyex rosin which has been produced by the treatment of any of the various types of rosin, such as, for example, the various grades of wood rosin, French gum rosin, American gum rosin, etc. with a suitable catalyst, and is a salt of a Hyex rosin with an alkali metal, as sodium, potassium, of an alkaline earth metal, as, calcium, barium, etc., or with other metals, as, aluminum, boron, etc. The metallic salt of the Hyex rosin used may contain a small proportion of unneutralized Hyex rosin without detriment to the product. The lubricating oil used in the production of my improved lubricating grease may be any oil suitable for use as a lubricant, and preferably, a petroleum lubricating oil.

The product, in accordance with this invention, will contain from about 3 parts to about 15 parts, by weight, of a metallic salt of a Hyex rosin to 100 parts, by weight, of a lubricating oil, and preferably about 5 parts to about 8 parts, by weight, of a metallic salt of Hyex rosin to 100 parts, by weight, of a lubricating oil. The product, in accordance with this invention, may, if desired, contain from about 1 part to about 25 parts, by weight of water emulsified in 100 parts of the mixture of the metallic salt of a Hyex rosin and the lubricating oil.

The product in accordance with this invention may be conveniently prepared by dissolving the Hyex rosin in the lubricating oil and then admixing this solution with a suspension of a metallic hydroxide in a lubricating oil, preferably at a slightly elevated temperature. The product after the partial neutralization of Hyex rosin will contain only the water produced by the neutralization reaction. If desired, additional water may be added to the mixture and emulsified therein by vigorous agitation to increase the consistency of the product.

Alternately, a metallic salt of a Hyex rosin may be admixed with a lubricating oil, preferably at a temperature within the range of about 30° C.

to about 60° C. Likewise, a mixture of a lubricating oil, a Hyex rosin, and a sufficient quantity of a metallic hydroxide to neutralize the acidity of the Hyex rosin may be agitated together. In each of these alternative procedures water may be added during the preparation of the grease or mixed in after the grease is prepared.

The following examples illustrate procedures for the production of the improved lubricating grease in accordance with this invention.

*Example I*

Two hundred and fifty parts, by weight, of sifted hydrated lime were gradually added with stirring to 750 parts, by weight, of a petroleum lubricating oil having a specific gravity of 0.9305 and a viscosity at 100° F. of 235 sec. in a universal Saybolt viscosimeter. This mixture was agitated until a smooth homogeneous paste resulted. One hundred and seventy six parts of Hyex wood rosin was then dissolved in an equal weight of the engine oil, and the solution so prepared, rapidly admixed with the hydrated lime-oil paste, stirred rapidly for a few seconds and then more slowly until set occurs.

*Example II*

Eighty parts, by weight, of quick lime were slaked by addition of 200 parts, by weight, of water. Two hundred parts, by weight, of this mixture was then mixed with 200 parts, by weight, of a petroleum lubricating oil (S. A. E. viscosity of 20 w.) and stirred until a uniform mixture was produced. This mixture was an emulsion but was not stable. Fifteen parts, by weight, of Hyex wood rosin was then dissolved in 15 parts, by weight, of the petroleum oil, and to this solution was added 85 parts, by weight, of the emulsion of slaked lime, water and petroleum oil, with vigorous agitation. After thorough stirring, the product formed a gel which would not flow at room temperature.

As mentioned above, the metallic salts of Hyex rosins are superior grease setting agents and are superior to gum rosin oil fractions for this purpose. The superiority of the metallic salts of Hyex rosins over the metallic salts of the kidney oil fraction of rosin oil was demonstrated by the production of a series of greases using the procedure and proportions of Example II, except with the substitution of 10 parts of Hyex wood rosin, five parts of Hyex wood rosin and fifteen parts of kidney oil, respectively, for the fifteen parts of Hyex wood rosin used in Example II. A comparison of the products showed that they rated as to quality in the following order:

| | Parts |
|---|---|
| Hyex rosin, (Example II), hardest and best | 15 |
| Do | 10 |
| Do | 5 |
| Rosin oil, poorest | 15 |

Thus it will be seen that 5 parts of Hyex wood rosin produced a grease having better set and body than the grease produced using 15 parts of rosin oil.

This invention makes possible the use of substantially 100% of both wood and gum rosins in the preparation of grease, since there is practically no loss of rosin in the treatment to produce the Hyex rosins. Furthermore, this invention allows the use of a smaller amount of rosin to produce a grease of a given consistency due to the superior grease-setting properties of the Hyex rosins, and in addition allows the production of greases having a broader range of properties than was heretofore possible.

It will be understood that my invention as broadly described and claimed is in no way limited by the examples and details given herein.

What I claim and desire to protect by Letters Patent is:

1. A lubricant comprising a lubricating oil admixed with a metallic salt of a rosin which has been subjected to treatment with a hydrogenation catalyst at an elevated temperature in the absence of added substances capable of reducing the unsaturation of the rosin under the conditions of treatment.

2. A lubricant comprising a lubricating oil admixed with an alkaline earth salt of a rosin which has been subjected to treatment with a hydrogenation catalyst at an elevated temperature in the absence of added substances capable of reducing the unsaturation of the rosin under the conditions of treatment.

3. A lubricant comprising a lubricating oil admixed with a calcium salt of a rosin which has been subjected to treatment with a hydrogenation catalyst at an elevated temperature in the absence of added substances capable of reducing the unsaturation of the rosin under the conditions of treatment.

4. A lubricant comprising a lubricating oil admixed with an alkali metal salt of a rosin which has been subjected to treatment with a hydrogenation catalyst at an elevated temperature in the absence of added substances capable of reducing the unsaturation of the rosin under the conditions of treatment.

5. A lubricant comprising a lubricating oil admixed with a sodium salt of a rosin which has been subjected to treatment with a hydrogenation catalyst at an elevated temperature in the absence of added substances capable of reducing the unsaturation of the rosin under the conditions of treatment.

6. A lubricant comprising a lubricating oil containing dissolved therein, a metallic salt of rosin which has been subjected to treatment with a hydrogenation catalyst at an elevated temperature in the absence of added substances capable of reducing the unsaturation of the rosin under the conditions of treatment.

7. A lubricant comprising a lubricating oil containing dissolved therein a metallic salt of a rosin which has been subjected to treatment with a hydrogenation catalyst at an elevated temperature in the absence of added substances capable of reducing the unsaturation of the rosin under the conditions of treatment, and containing water emulsified therein.

8. A lubricant comprising a lubricating oil containing dissolved therein a metallic salt of a rosin which has been subjected to treatment with a hydrogenation catalyst at an elevated temperature in the absence of added substances capable of reducing the unsaturation of the rosin under the conditions of treatment, and containing powdered graphite suspended therein.

9. A method for the production of a lubricant which comprises forming in a lubricating oil a solution of a metallic salt of a rosin which has been subjected to treatment with a hydrogenation catalyst at an elevated temperature in the absence of added substances capable of reducing the unsaturation of the rosin under the conditions of treatment.

10. A method for the production of a lubricant which comprises forming in a lubricating oil a solution of a rosin which has been subjected to treatment with a hydrogenation catalyst at an elevated temperature in the absence of added substances capable of reducing the unsaturation of the rosin under the conditions of treatment, and admixing this solution with a suspension of a metallic hydroxide in a lubricating oil.

11. A method for the production of a lubricant which comprises admixing a lubricating oil, a metallic hydroxide and a rosin which has been subjected to treatment with a hydrogenation catalyst at an elevated temperature in the absence of added substances capable of reducing the unsaturation of the rosin under the conditions of treatment.

DONALD A. LISTER.